(12) United States Patent
Oishi

(10) Patent No.: US 9,787,367 B2
(45) Date of Patent: Oct. 10, 2017

(54) READING APPARATUS AND READING METHOD THAT READS TRANSMISSION INFORMATION FROM FIRST TAG AND SECOND TAG ARRANGED IN ROAD

(71) Applicant: TOSHIBA TEC KABUSHIKI KAISHA, Shinagawa-ku, Tokyo (JP)

(72) Inventor: Sadatoshi Oishi, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/270,202

(22) Filed: Sep. 20, 2016

(65) Prior Publication Data

US 2017/0126286 A1 May 4, 2017

(30) Foreign Application Priority Data

Oct. 30, 2015 (JP) .................. 2015-214607

(51) Int. Cl.
*H04B 5/00* (2006.01)
*G06K 7/10* (2006.01)
*G07C 5/02* (2006.01)

(52) U.S. Cl.
CPC ....... *H04B 5/0062* (2013.01); *G06K 7/10316* (2013.01); *G06K 7/10425* (2013.01); *G07C 5/02* (2013.01)

(58) Field of Classification Search
None
See application file for complete search history.

(56) References Cited

U.S. PATENT DOCUMENTS 6,587,755 B1 * 7/2003 Smith et al. ....... G06Q 30/0269
340/928

FOREIGN PATENT DOCUMENTS

| JP | 2002-201608 | 7/2002 |
| JP | 2005-164426 | 6/2005 |

* cited by examiner

*Primary Examiner* — Craig A. Renner
(74) *Attorney, Agent, or Firm* — Amin, Turocy & Watson LLP

(57) ABSTRACT

A reading apparatus reads transmission information from a first tag and a second tag arranged in a road via wireless communication, and is loaded on a vehicle. The reading apparatus comprises an antenna and a controller. The antenna outputs a request signal for requesting transmission of predetermined information to the first tag and the second tag. The first tag is arranged at a first reference point as reference. The second tag is arranged at a second reference point as reference away from an advancing direction of the vehicle with respect to the first reference point. The controller stops output of the request signal when acquiring a reference distance between the first reference point and the second reference point from the first tag, calculates a required time for which the vehicle moves to the second reference point on the basis of the reference distance and a travelling speed of the vehicle.

6 Claims, 6 Drawing Sheets

| EPC AREA | | | | | |
|---|---|---|---|---|---|
| 1 | 2 | 3 | 4 | 5 | 6 |
| HEADER | DISTANCE | SERIAL NUMBER | | | |

| EPC AREA | | | | | | USER AREA |
|---|---|---|---|---|---|---|
| 1 | 2 | 3 | 4 | 5 | 6 | 1 |
| HEADER | SERIAL NUMBER | | | | | SENSOR INFORMATION |

READING APPARATUS AND READING METHOD THAT READS TRANSMISSION INFORMATION FROM FIRST TAG AND SECOND TAG ARRANGED IN ROAD

CROSS-REFERENCE TO RELATED APPLICATION

This application is based upon and claims the benefit of priority from Japanese Patent Application No. P2015-214607, filed Oct. 30, 2015, the entire contents of which are incorporated herein by reference.

FIELD

Embodiments described herein relate generally to a reading apparatus and a reading method.

BACKGROUND

It is necessary that a RFID (radio frequency identifier) reader in an UHF band which moves and is used outdoors is classified as 920 MHz-band moving body identification wireless equipment for specified low-power radio station, and conforms to a standard specification of ARIB STD-T107 formulated by Association of Radio Industries and Businesses. Specifically, emission of a radio wave stops within a transmission time (4 seconds) after the radio wave is emitted, and subsequent transmission cannot be carried out before a transmission pause time (50 ms) elapses.

When the RFID reader is loaded on a vehicle, there is a case in which a transmission pause time occurs while the vehicle is travelling. In this case, during the transmission pause time, reading of information by the RFID reader cannot be carried out. In other words, as the vehicle also travels during the transmission pause time, in the transmission pause time, there is a case in which the vehicle passes through a location at which a RFID tag is arranged, and the RFID reader cannot read information from the RFID tag.

DETAILED DESCRIPTION

In accordance with an embodiment, a reading apparatus reads transmission information from a first tag and a second tag arranged in a road via wireless communication, and is loaded on a vehicle. The reading apparatus comprises an antenna and a controller. The antenna outputs a request signal for requesting transmission of predetermined information to the first tag and the second tag. The controller controls output of the request signal. The first tag is arranged at a first reference point as reference. The second tag is arranged at a second reference point as reference away from an advancing direction of the vehicle with respect to the first reference point.

The controller stops the output of the request signal when acquiring a distance between the first reference point and the second reference point from the first tag, and calculates a required time for which the vehicle moves to the second reference point on the basis of the distance and a travelling speed of the vehicle. When the required time elapses, the controller starts transmission of the request signal.

Figure 1:
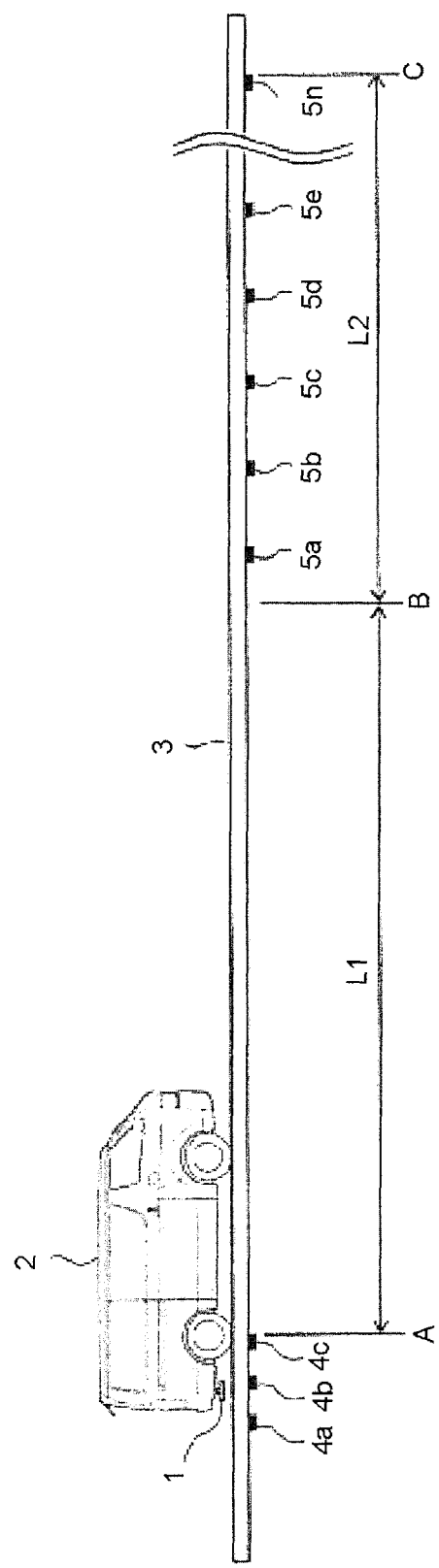
FIG. 1 is a diagram illustrating a use state of a RFID reading apparatus.
Figure 2:
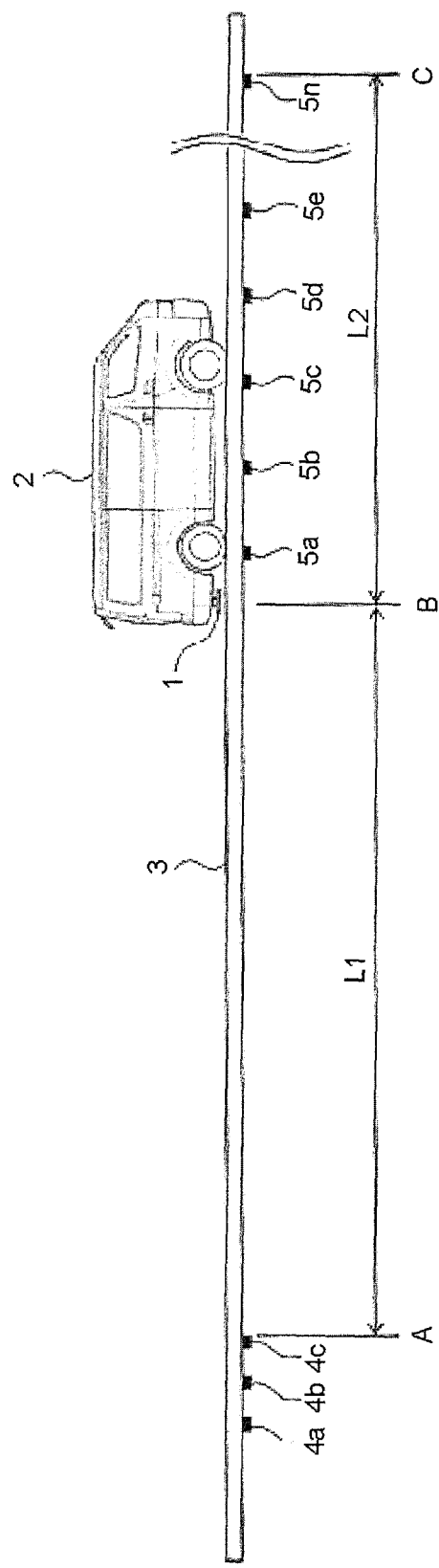
FIG. 2 is a diagram illustrating the use state of the RFID reading apparatus.

FIG. 1 and FIG. 2 illustrate a use state of a RFID reading apparatus 1 according to the present embodiment. As shown in FIG. 1 and FIG. 2, the RFID reading apparatus 1 is loaded on a vehicle 2. In the present embodiment, the RFID reading apparatus 1 is arranged on the bottom of the rear side of the vehicle 2; however, the present invention is not limited to this. In other words, the RFID reading apparatus 1 may be loaded on the vehicle 2 in such a manner that the RFID reading apparatus 1 can read information transmitted from first tags 4a~4c and second tags 5a~5n which are described later.

The first tags 4a, 4b and 4c and the second tags 5a~5n are arranged in a road 3. A concrete floor slab used in a bridge is also included in the road 3. The first tags 4a~4c and the second tags 5a~5n can also be buried in the road 3, or on the bottom of the concrete floor slab.

Further, a location at which the first tags 4a~4c and the second tags 5a~5n are arranged is not limited to the road 3, and can be properly determined. In other words, the first tags 4a~4c and the second tags 5a~5n may be arranged at a location through which the vehicle 2 passes.

For example, side walls may be arranged at ends of the road 3 in the width direction, and the first tags 4a~4c and the second tags 5a~5n can be arranged on the side walls. In this case, the RFID reading apparatus 1 may be loaded on the vehicle 2 in such a manner that an under-mentioned antenna arranged in the RFID reading apparatus 1 faces the side wall side. On the other hand, the first tags 4a~4c and the second tags 5a~5n can also be arranged on a side or a ceiling portion of a tunnel. In this case, the RFID reading apparatus 1 may be loaded on the vehicle 2 in such a manner that the antenna in the RFID reading apparatus 1 faces the side or the ceiling portion of the tunnel.

When the first tags 4a~4c and the second tags 5a~5n are arranged in the road 3, there is a case in which antennas of the first tags 4a~4c and the second tags 5a~5n are covered by component members of the road 3. In this case, it is possible to arrange a spacer of foam polystyrene on the surface of the antenna. In this way, the component member of the road 3 can suppress that there is negative influence on reception and transmission of the antenna.

The first tags 4a~4c and the second tags 5a~5n are RFID tags. Information of a reference distance L1 described later is recorded in the first tags 4a~4c, and the first tags 4a~4c transmit the information of the reference distance L1. As described later, a sensor is connected with the second tags 5a~5n, and the second tags 5a~5n transmit information of the sensor.

The first tags 4a~4c are arranged in parallel in a travelling direction of the vehicle 2, and intervals respectively being between two adjacent tags of the first tags 4a~4c in the travelling direction of the vehicle 2 are equal. The first tag 4c is arranged nearby a first reference point A. The first tags 4a and 4b are arranged in a direction opposite to the advancing direction of the vehicle 2 with respect to the first tag 4c.

In the present embodiment, three first tags 4a~4c are arranged; however, the number of the first tags can be properly determined. A plurality of the first tags is not only arranged in the travelling direction of the vehicle 2, but also can also be arranged in the width direction of the vehicle 2 (in other words, the width direction of the road 3).

The second tags 5a~5n are arranged in parallel in the travelling direction of the vehicle 2, and intervals respectively being between two adjacent tags of the second tags 5a~5n in the travelling direction of the vehicle 2 are equal. The second tag 5a is arranged nearby a second reference point B. The reference distance L1 is a distance (distance in the advancing direction of the vehicle 2) between the first reference point A and the second reference point B.

The second tag 5n is arranged nearby a third reference point C. The second tags 5a~5n are arranged between the second reference point B and the third reference point C. A distance (distance in the advancing direction of the vehicle 2) between the second reference point B and the third reference point C is a distance L2. The distance L2 is determined by taking a travelling speed (vehicle speed) Ve of the vehicle 2 which is assumed in advance and a time (transmission allowed time) for which the RFID reading apparatus 1 can continue transmitting a signal (referred to as a request signal) for requesting transmission of predetermined information to the second tags 5a~5n into consideration. The transmission allowed time is determined in advance, and thus the distance L2 is calculated by multiplying the transmission allowed time by the vehicle speed Ve.

The number of the second tags 5a~5n can be properly determined. A plurality of the second tags is not only arranged in the travelling direction of the vehicle 2, but also can also be arranged in the width direction of the vehicle 2 (in other words, the width direction of the road 3).

As shown in FIG. 1, when the vehicle 2 travels through locations at which the first tags 4a~4c are arranged, the RFID reading apparatus 1 can transmit a signal (referred to as a request signal) for requesting transmission of the information of the reference distance L1 to the first tags 4a~4c. The RFID reading apparatus 1 can read the information of the reference distance L1 transmitted from the first tags 4a~4c.

As shown in FIG. 2, when the vehicle 2 travels through locations at which the second tags 5a~5n are arranged, the RFID reading apparatus 1 can transmit the request signal to the second tags 5a~5n. The RFID reading apparatus 1 can read the predetermined information transmitted from the second tags 5a~5n.

Figure 3:
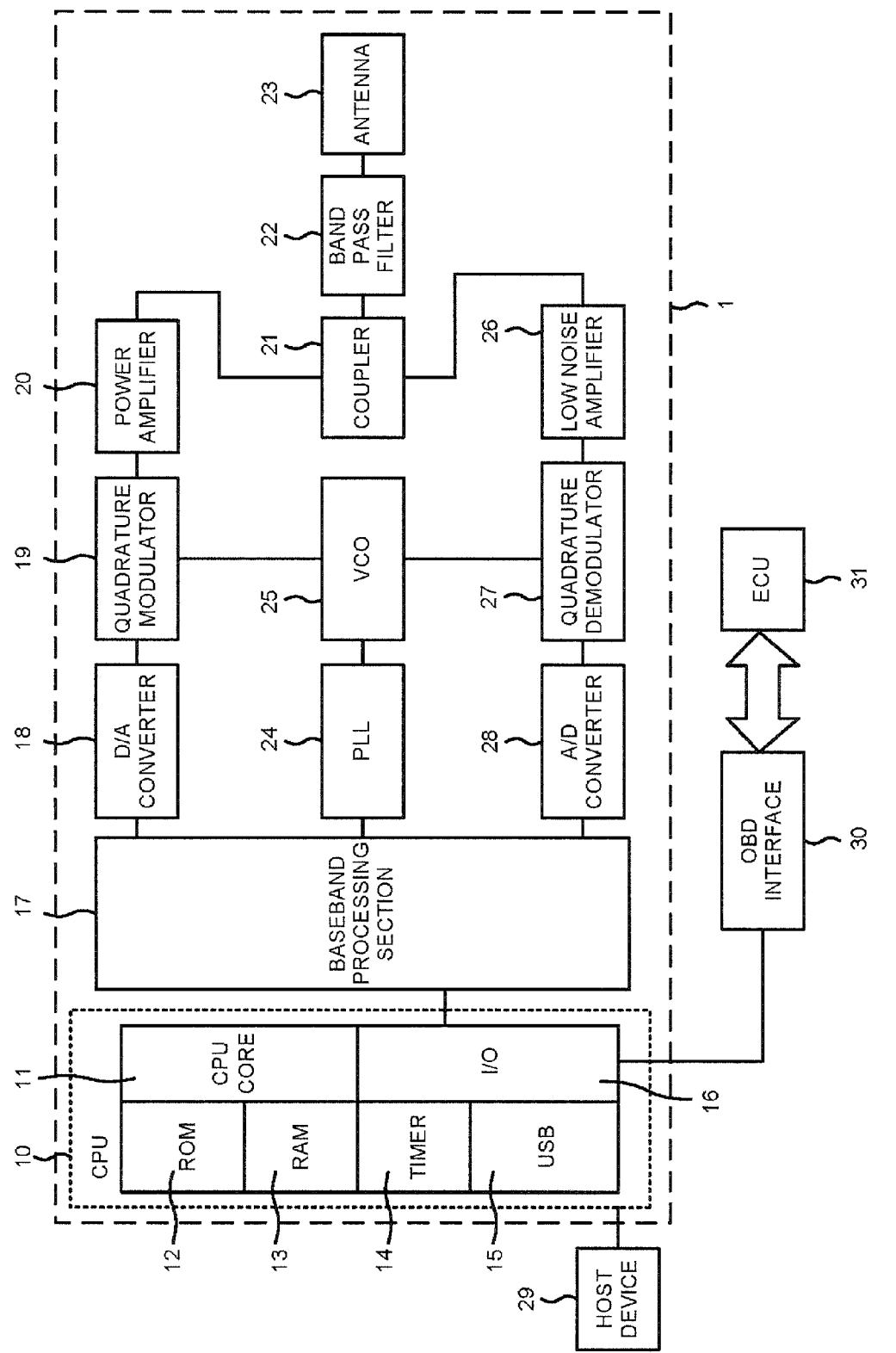
FIG. 3 is a diagram illustrating the configuration of the RFID reading apparatus and peripheral devices of the RFID reading apparatus.

Next, the configuration of the RFID reading apparatus 1 is described with reference to FIG. 3.

The RFID reading apparatus 1 is connected with a host device 29 arranged in the vehicle 2 and an OBD (On-Board Diagnostics) interface 30. The OBD interface 30 can communicate with an engine control unit (ECU) 31 arranged in the vehicle 2. The ECU 31 acquires the travelling speed (vehicle speed) of the vehicle 2 and the like to control the travelling of the vehicle 2. When the vehicle 2 is an electric automobile, the OBD interface 30 may communicate with a control unit which controls the travelling of the electric automobile.

The RFID reading apparatus 1 includes a CPU 10. The CPU 10 includes a CPU core 11, a ROM 12, a RAM 13, a timer 14, an USB interface 15 and an I/O 16, and operates according to a prestored program. The USB interface 15 is connected with the host device 29. The I/O 16 is connected with the OBD interface 30.

A baseband processing section 17 is connected with the I/O 16, and processes a transmission and reception signal of the RFID reading apparatus 1. Further, the baseband processing section 17 controls operations of a PLL 24 to output a local frequency serving as a frequency identical to that of a carrier wave from a VCO 25.

The baseband processing section 17 carries out encoding of a transmission signal output from the CPU 10. For example, the baseband processing section 17 encodes the transmission signal with a Manchester code or a FMO code. The Manchester code is obtained with an encoding method in which the code rises in the center of a bit when data is 0 and falls in the center of the bit when the data is 1. In other words, when the data is 0, the code is set to 0 and 1, and when the data is 1, the code is set to 1 and 0. The FMO code is obtained with an encoding method in which the code is necessarily reversed at the boundary of a bit, but the code is also reversed even in the center of the bit when data is 0.

A transmission circuit is constituted by a D/A converter 18, a quadrature modulator 19, a power amplifier 20, the PLL 24 and the VCO 25. The quadrature modulator 19 carries out amplitude modulation on the local signal from the VCO 25 with the transmission signal from the D/A converter 18. The power amplifier 20 carries out power amplification on the transmission signal to which the amplitude modulation is carried out by the quadrature modulator 19, and outputs the transmission signal after the power amplification is carried out to a coupler 21.

The transmission signal input to the coupler 21 is output to an antenna 23 via a band pass filter 22. In this way, the antenna 23 radiates a radio wave. The radio wave as stated above is the request signal to the first tags 4a~4c and the second tags 5a~5n.

A reception circuit for processing the signal received by the antenna 23 is also connected with the coupler 21. The reception circuit is constituted by the PLL 24 and the VCO 25 which are described above, a low noise amplifier 26, a quadrature demodulator 27 and an A/D converter 28. The reception circuit carries out a reception processing with a direct conversion system.

The RFID reading apparatus 1 transmits the request signal to the first tags 4a~4c and the second tags 5a~5n from the antenna 23. The RFID reading apparatus 1 receives the predetermined information transmitted from the first tags 4a~4c and the second tags 5a~5n via the antenna 23. The RFID reading apparatus 1 can acquire the information of the vehicle speed via the OBD interface 30. The RFID reading apparatus 1 can record the predetermined information received from the second tags 5a~5n in the host device 29.

Figure 4:
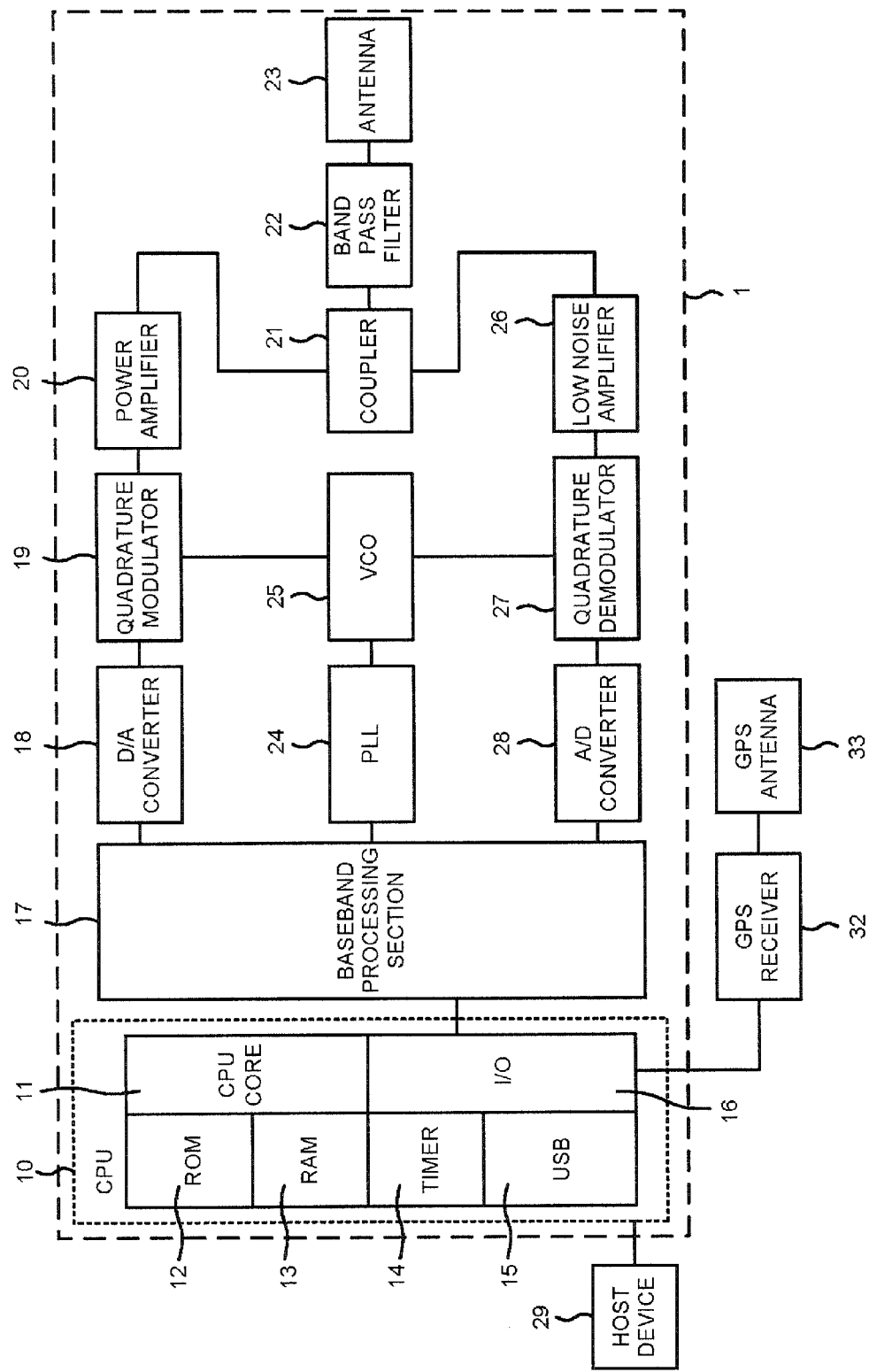
FIG. 4 is a diagram illustrating the configuration of the RFID reading apparatus and peripheral devices of the RFID reading apparatus.

On the other hand, as shown in FIG. 4, the RFID reading apparatus 1 can also be connected with a GPS (Global Positioning System) receiver 32. The GPS receiver 32 is connected with a GPS antenna 33. In FIG. 4, other configurations except the GPS receiver 32 and the GPS antenna 33 are identical to these described in FIG. 3.

In the configuration shown in FIG. 4, the vehicle speed can be calculated by using the GPS receiver 32 and the GPS antenna 33. If the GPS receiver 32 and the GPS antenna 33 are used, a travelling position of the vehicle 2 can be specified. The vehicle speed can be calculated on the basis of a distance (in other words, a travelling distance) at the time the travelling position changes and a time (in other words, a travelling time) at the time the travelling position changes.

Figures 5, 6, 7:
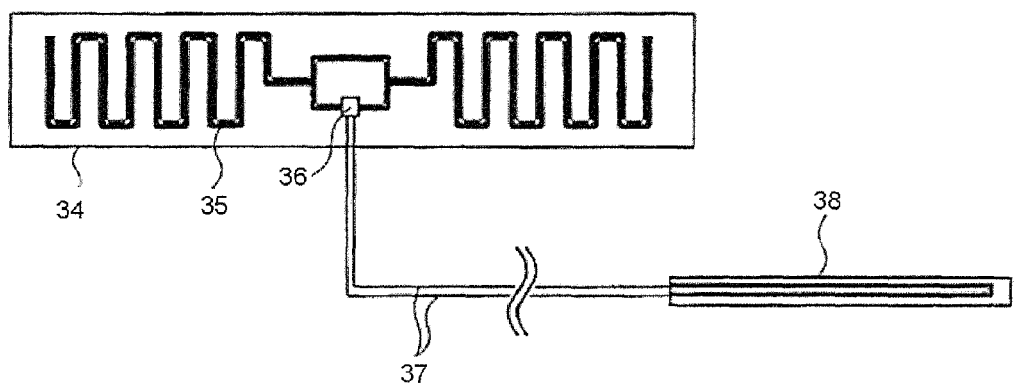
FIG. 5 is a diagram illustrating a memory map of first tags.
FIG. 6 is a diagram illustrating a memory map of second tags.
FIG. 7 is a diagram illustrating structures of the second tag and a sensor.

Next, a memory map of the first tags 4a~4c is described with reference to FIG. 5.

In the memory map of the first tags 4a~4c, an EPC area of 6 words is used. 1 word at the head is assigned to a header, 2 word is assigned to the reference distance L1, and the remaining 4 words are assigned to serial numbers. The header is identification information indicating that a transmission destination is the first tags 4a~4c, for example, identification information such as "0001 h" can be stored in the 1 word. The predetermined information corresponding to the reference distance L1 represented by a predetermined unit (for example, mm) is stored in the 2 word. For example, when the reference distance L1 is 10,000 mm, the predetermined information such as "2710 h" can be stored in the 2 word.

Next, a memory map of the second tags 5a~5n is described with reference to FIG. 6.

In the memory map of the second tags 5a~5n, an EPC area of 6 words and a user area are used. In the EPC area, 1 word at the head is assigned to a header, and the remaining 5 words are assigned to serial numbers. The header is identification information indicating that the transmission destination is the second tags 5a~5n. In the user area, the information of the sensor connected with the second tags 5a~5n is stored.

Next, the structures of the second tags 5a~5n and the structure of the sensor connected with the second tags 5a~5n are described with reference to FIG. 7.

In the second tags 5a~5n, an antenna 35 is formed in a film-like base material 34, and the antenna 35 is connected with a RFID chip 36. A sensor 38 is connected with the RFID chip 36 via a lead wire 37. In the present embodiment, a crack sensor 38 is used as the sensor 38. The sensor 38 can be fixed in the road 3 with an adhesive.

When the crack sensor 38 is a normal state, the crack sensor 38 becomes a conduction state. If a crack of the road 3 is becoming large and the crack reaches the crack sensor 38, the crack sensor 38 is broken. In this way, the crack sensor 38 becomes a non-conduction state, and the RFID chip 36 can detect the non-conduction state of the crack sensor 38. In the user area shown in FIG. 6, information (sensor information) indicating the conduction state or the non-conduction state of the crack sensor 38 is stored.

In the present embodiment, the crack sensor 38 is used as the sensor 38; however, other sensors can also be used. For example, a temperature sensor for detecting a temperature, a vibration sensor for detecting vibration, and an acceleration sensor for detecting acceleration can be used as the sensor 38. By connecting these sensors 38 with the RFID chip 36, the information detected by the sensors 38 can be stored in the user area shown in FIG. 6.

Next, operations of the RFID reading apparatus 1 are described with reference to a flowchart shown in FIG. 8.

Figure 8:
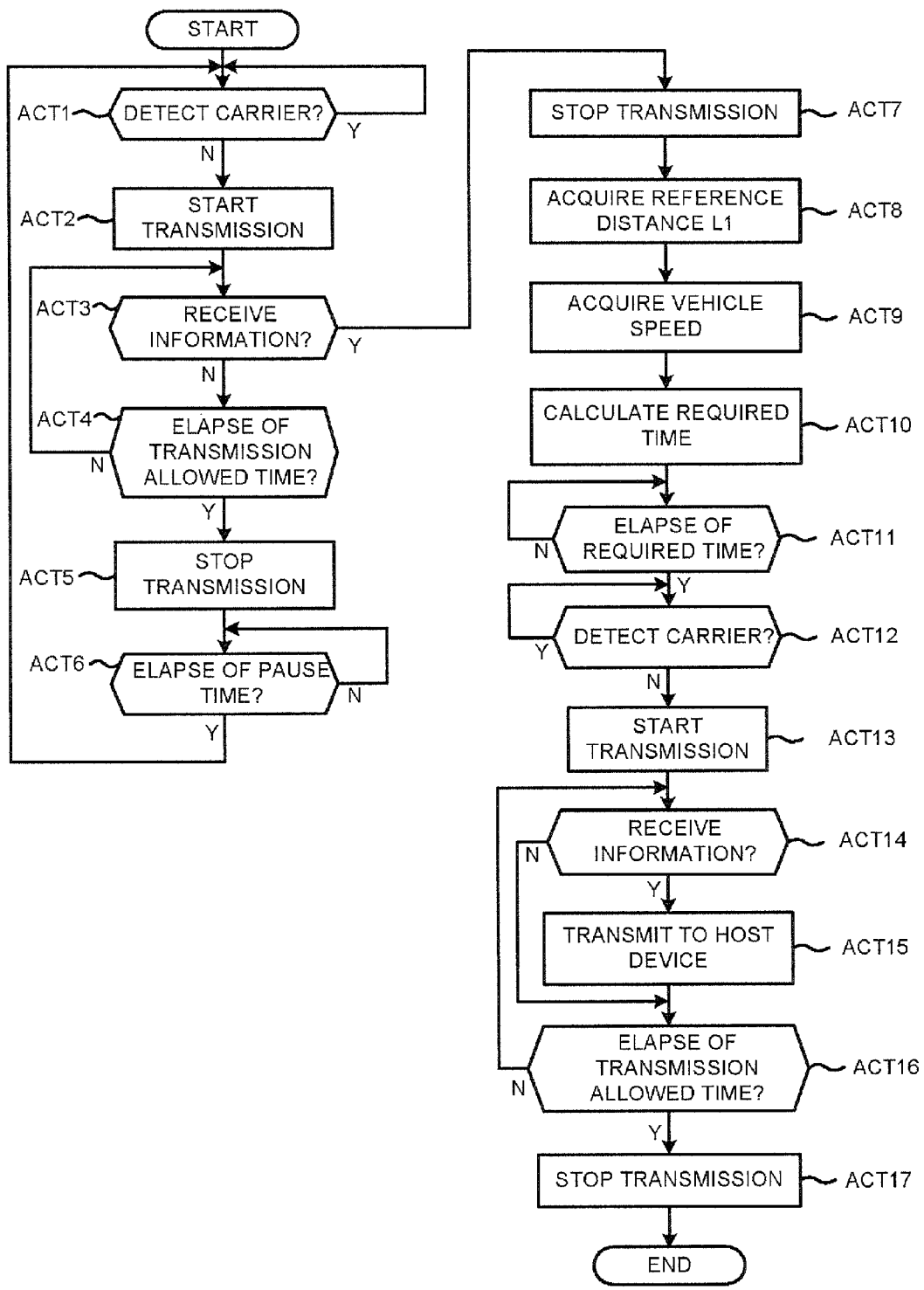
FIG. 8 is a flowchart illustrating operations of the RFID reading apparatus.

If the RFID reading apparatus 1 is activated, the operations shown in FIG. 8 are started. Specifically, when the vehicle 2 is close to the first reference point A, the RFID reading apparatus 1 can be activated. The host device 29 activates the RFID reading apparatus 1.

The activation of the RFID reading apparatus 1 can be carried out through a manual operation by a user or carried out automatically by acquiring the predetermined information. For example, if a switch for activating the RFID reading apparatus 1 is arranged, the host device 29 receives a signal obtained when the user operates the switch to be capable of activating the RFID reading apparatus 1. On the other hand, as shown in FIG. 4, if the GPS receiver 32 and the GPS antenna 33 are used, the host device 29 can grasp the current travelling position of the vehicle 2. The host device 29 can activate the RFID reading apparatus 1 when a distance from the current travelling position of the vehicle 2 to the first reference point A is equal to or smaller than a predetermined distance.

After the RFID reading apparatus 1 is activated, during a predetermined time (for example, time equal to or smaller than 5 ms), the RFID reading apparatus 1 carries out a carrier sense to determine whether to detect carriers with the same frequency (ACT 1). When detecting the carrier (Y in ACT 1), the RFID reading apparatus 1 repeats the carrier sense. On the other hand, when not detecting the carrier (N in ACT 1), the RFID reading apparatus 1 starts the transmission of the request signal (ACT 2).

As the vehicle 2 travels through the locations at which the first tags 4a~4c are arranged, the request signal of the RFID reading apparatus 1 is transmitted towards the first tags 4a~4c. Further, when the RFID reading apparatus 1 starts the transmission of the request signal, measurement of time by the timer 14 (refer to FIG. 3 and FIG. 4) is started.

The RFID reading apparatus 1 determines whether to receive the transmission information from the first tags 4a~4c (ACT 3). If the request signal from the RFID reading apparatus 1 reaches the first tags 4a~4c, the predetermined information is transmitted from the first tags 4a~4c. In this way, the RFID reading apparatus 1 can receive the transmission information from the first tags 4a~4c.

When the RFID reading apparatus 1 does not receive the transmission information from the first tags 4a~4c (N in ACT 3), the RFID reading apparatus 1 confirms the measurement time of the timer 14 which is started in the processing in ACT 2 to determine whether or not the measurement time is equal to or greater than the transmission allowed time (for example, 4 seconds) (ACT 4). The transmission allowed time refers to the time for which the RFID reading apparatus 1 can continue transmitting the request signal, and is determined in advance. When the measurement time is shorter than the transmission allowed time (N in ACT 4), the RFID reading apparatus 1 returns to the processing in ACT 3.

On the other hand, when the measurement time is equal to or greater than the transmission allowed time (Y in ACT 4), the RFID reading apparatus 1 stops the transmission of the request signal (ACT 5). When the transmission of the request signal is stopped, the measurement of the time by the timer 14 (refer to FIG. 3 and FIG. 4) is started.

The RFID reading apparatus 1 confirms the measurement time of the timer 14 which is started in the processing in ACT 5 to determine whether or not the measurement time is equal to or greater than a pause time (for example, 50 milliseconds) (ACT 6). The pause time refers to a time for which the transmission of the request signal cannot be carried out after the RFID reading apparatus 1 stops the transmission of the request signal, and is determined in advance. The RFID reading apparatus 1 stands by until the measurement time becomes equal to or greater than the pause time. When the measurement time is equal to or greater than the pause time (Y in ACT 6), the RFID reading apparatus 1 carries out the processing in ACT 1 and the processing following ACT 1.

In the processing in ACT 3, when receiving the transmission information from the first tags 4a~4c (Y in ACT 3), the RFID reading apparatus 1 stops the transmission of the request signal and starts the measurement of the timer 14

(ACT 7). When receiving the transmission information from any one of the three first tags 4a~4c, the RFID reading apparatus 1 can carry out the processing in ACT 7.

The RFID reading apparatus 1 acquires the information of the reference distance L1 included in the transmission information from the first tags 4a~4c (ACT 8). As the information described in FIG. 5 is transmitted from the first tags 4a~4c, the RFID reading apparatus 1 can confirm that the transmission destination is the first tags 4a~4c on the basis of the information stored in the header of the 1 word. Further, the RFID reading apparatus 1 can acquire the reference distance L1 on the basis of the information stored in the 2 word.

The RFID reading apparatus 1 acquires the information of the current vehicle speed (ACT 9). The RFID reading apparatus 1 calculates the time (required time) $\Delta t$ until the vehicle 2 reaches the second reference point B on the basis of the reference distance L1 and the current vehicle speed (ACT 10). When the RFID reading apparatus 1 proceeds to the processing in ACT 7 from the processing in ACT 3, as the measurement of the timer 14 is started, the RFID reading apparatus 1 determines whether or not the measurement time of the timer 14 is equal to or greater than the required time $\Delta t$ (ACT 11). The RFID reading apparatus 1 stands by until the measurement time is equal to or greater than the required time $\Delta t$ (N in ACT 11). When the measurement time reaches the required time $\Delta t$, the vehicle 2 travels by only the reference distance L1 and reaches the location at which the second tag 5a is arranged.

When the measurement time is equal to or greater than the required time $\Delta t$ (Y in ACT 11), the RFID reading apparatus 1 carries out the carrier sense to determine whether to detect the carrier (ACT 12). When detecting the carrier (Y in ACT 12), the RFID reading apparatus 1 repeats the carrier sense. On the other hand, when not detecting the carrier (N in ACT 12), the RFID reading apparatus 1 starts the transmission of the request signal (ACT 13).

When the transmission of the request signal is started, as the vehicle 2 reaches the location at which the second tag 5a is arranged, the request signal of the RFID reading apparatus 1 is transmitted towards the second tags 5a~5n. When the RFID reading apparatus 1 starts the transmission of the request signal, the measurement of the time by the timer 14 (refer to FIG. 3 and FIG. 4) is started.

The RFID reading apparatus 1 determines whether to receive the transmission information from the second tags 5a~5n (ACT 14). If the request signal from the RFID reading apparatus 1 reaches the second tags 5a~5n, the predetermined information is transmitted from the second tags 5a~5n. In this way, the RFID reading apparatus 1 can receive the transmission information from the second tags 5a~5n.

The RFID reading apparatus 1 transmits the transmission information from the second tags 5a~5n to the host device 29 (ACT 15) when receiving the transmission information from the second tags 5a~5n (Y in ACT 14). As the information described in FIG. 6 is transmitted from the second tags 5a~5n, the RFID reading apparatus 1 can acquire the sensor information included in the transmission information from the second tags 5a~5n. By transmitting the sensor information to the host device 29, the sensor information can be recorded in the host device 29.

In the processing in ACT 13, the measurement of the time by the timer 14 is started, and the RFID reading apparatus 1 determines whether or not the measurement time of the timer 14 is equal to or greater than the transmission allowed time (for example, 4 seconds) (ACT 16). Regardless of whether or not to receive the transmission information from the second tags 5a~5n, the processing in ACT 16 is carried out. When the measurement time is shorter than the transmission allowed time, the RFID reading apparatus 1 returns to the processing in ACT 14. When the measurement time is equal to or greater than the transmission allowed time (Y in ACT 16), the RFID reading apparatus 1 stops the transmission of the request signal (ACT 17).

In the present embodiment, it is necessary to acquire the sensor information from the second tags 5a~5n. The RFID reading apparatus 1 acquires the information of the reference distance L1 from the first tags 4a~4c, and thus the locations at which the second tags 5a~5n are arranged can be grasped. After the vehicle 2 travels by the reference distance L1, by starting the transmission of the request signal, the request signal can be transmitted from the location at which the second tag 5a is arranged. In this way, as the request signal can be transmitted to the second tags 5a~5n, the transmission information from the second tags 5a~5n can be received, and the sensor information can be acquired.

If the locations at which the second tags 5a~5b are arranged are not grasped, there is a case in which the request signal cannot be transmitted to the second tags 5a~5n. Specifically, when the RFID reading apparatus 1 stops the transmission of the request signal, there is a case in which the vehicle 2 reaches the locations at which the second tags 5a~5b are arranged. In this case, the request signal from the RFID reading apparatus 1 do not reach the second tags 5a~5b, and the transmission information from the second tags 5a~5n (in other words, the sensor information) cannot be acquired. According to the present embodiment, by acquiring the sensor information as stated above, acquisition leakage of the sensor information can be suppressed.

The second tags 5a~5n are arranged in the range of the distance L2. As stated above, by determining the distance L2 on the basis of the vehicle speed assumed in advance and the transmission allowed time, when the vehicle 2 travels in the transmission allowed time, the request signal can be transmitted to all the second tags 5a~5n. In this case, all sensor information can be acquired from all the second tags 5a~5n.

In the present embodiment, as the three first tags 4a~4c are arranged, the information of the reference distance L1 can be acquired from at least one first tag. In a case in which only one first tag 4a is arranged, when the vehicle 2 reaches the location at which the first tag 4a is arranged, it is also possible that the transmission of the request signal by the RFID reading apparatus 1 is stopped. In this case, the information of the reference distance L1 cannot be acquired from the first tag 4a.

As the present embodiment, if a plurality of the first tags is arranged, even if the transmission of the request signal is stopped, the information of the reference distance L1 can be acquired from at least one first tag. On the other hand, if the interval between two adjacent tags of the first tags 4a~4c in the travelling direction of the vehicle 2 is wider than a predetermined interval described later, the acquisition leakage of the reference distance L1 can be suppressed. The predetermined interval is equivalent to a travelling distance when the vehicle 2 travels at the vehicle speed assumed in advance during the pause time. In this case, when the vehicle 2 travels between two adjacent tags of the first tags 4a~4c, the transmission of the request signal is stopped, and it can be suppressed that the request signal is not transmitted to the first tags 4a~4c.

While certain embodiments have been described, these embodiments have been presented by way of example only, and are not intended to limit the scope of the invention.

Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A reading apparatus, which reads transmission information from a first tag and a second tag arranged in a road via wireless communication and is loaded on a vehicle, comprising:

an antenna configured to output a request signal for requesting transmission of predetermined information to the first tag and the second tag; and a controller configured to control output of the request signal, wherein the first tag is arranged at a first reference point as reference, and the second tag is arranged at a second reference point as reference away from an advancing direction of the vehicle with respect to the first reference point; and the controller stops the output of the request signal when acquiring information of a reference distance serving as an interval between the first reference point and the second reference point, and meanwhile, calculates a required time for which the vehicle moves to the second reference point on the basis of the reference distance and a travelling speed of the vehicle, and starts transmission of the request signal when the required time elapses.

2. The reading apparatus according to claim 1, wherein the second tag transmits detection information of a sensor arranged in the road; and the controller receives the detection information transmitted from the second tag.

3. The reading apparatus according to claim 1, wherein the first tag is one of a plurality of first tags arranged in the road; and the controller stops the transmission of the request signal when receiving the information of the reference distance from one first tag among the plurality of first tags.

4. The reading apparatus according to claim 2, wherein the first tag is one of a plurality of first tags arranged in the road; and the controller stops the transmission of the request signal when receiving the information of the reference distance from one first tag among the plurality of first tags.

5. The reading apparatus according to claim 1, wherein the controller is communicable with a travelling controller for controlling travelling of the vehicle, and can acquire information of the travelling speed from the travelling controller.

6. A reading method for reading transmission information from a first tag and a second tag arranged in a road via wireless communication, wherein the first tag is arranged at a first reference point as reference, and the second tag is arranged at a second reference point as reference away from an advancing direction of a vehicle with respect to the first reference point, including:

stopping transmission of a request signal for requesting transmission of predetermined information to the first tag and the second tag when acquiring information of a reference distance serving as an interval between the first reference point and the second reference point from the first tag;

calculating a required time for which the vehicle moves to the second reference point on the basis of the reference distance and a travelling speed of the vehicle; and starting transmission of the request signal when the required time elapses.

* * * * *